US012025946B2

(12) United States Patent
Nitta et al.

(10) Patent No.: US 12,025,946 B2
(45) Date of Patent: Jul. 2, 2024

(54) IMAGE FORMING APPARATUS HAVING DUPLEX DRIVEN ROLLER UNIT

(71) Applicant: CANON KABUSHIKI KAISHA, Tokyo (JP)

(72) Inventors: Jumpei Nitta, Kanagawa (JP); Tomoya Tateishi, Kanagawa (JP); Akinori Mitsumata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 17/869,686

(22) Filed: Jul. 20, 2022

(65) Prior Publication Data

US 2023/0031782 A1 Feb. 2, 2023

(30) Foreign Application Priority Data

Jul. 27, 2021 (JP) ................................ 2021-122287

(51) Int. Cl.
*G03G 21/16* (2006.01)
*G03G 15/00* (2006.01)

(52) U.S. Cl.
CPC ..... *G03G 21/1633* (2013.01); *G03G 15/6529* (2013.01); *G03G 15/6567* (2013.01)

(58) Field of Classification Search
CPC ....... G03G 2215/00586; G03G 15/234; G03G 2215/00438; G03G 15/6579
See application file for complete search history.

(56) References Cited

U.S. PATENT DOCUMENTS

| | | | | |
|---|---|---|---|---|
| 8,406,680 B2 * | 3/2013 | Murata | G03G 15/6579 400/645.4 |
| 2001/0031155 A1 | 10/2001 | Hashimoto | |
| 2010/0254740 A1 * | 10/2010 | Murata | G03G 15/6579 399/401 |
| 2012/0237278 A1 * | 9/2012 | Kobayashi | G03G 15/234 399/381 |
| 2016/0299459 A1 * | 10/2016 | Endo | G03G 21/1619 |
| 2017/0255138 A1 | 9/2017 | Takahashi | |
| 2018/0305151 A1 * | 10/2018 | Ogata | B65H 29/22 |
| 2019/0064722 A1 * | 2/2019 | Ogata | B65H 85/00 |

FOREIGN PATENT DOCUMENTS

| | | |
|---|---|---|
| JP | 2000-026002 A | 1/2000 |
| JP | 4072892 B2 | 4/2008 |
| JP | 2016-099430 A | 5/2016 |

* cited by examiner

*Primary Examiner* — Jessica L Eley
(74) *Attorney, Agent, or Firm* — CANON U.S.A., INC. IP Division

(57) ABSTRACT

An image forming apparatus includes a drive roller configured to be rotated by a drive source, a first rotation member configured to be driven to rotate by the drive roller, and a second rotation member configured to be driven to rotate by the drive roller. The drive roller, the first rotation member, and the second rotation member are configured to convey a sheet in a state where the sheet is present at a first nip portion and a second nip portion at the same time.

14 Claims, 11 Drawing Sheets

IMAGE FORMING APPARATUS HAVING DUPLEX DRIVEN ROLLER UNIT

BACKGROUND OF THE INVENTION

Field of the Invention

The present invention relates to an image forming apparatus that forms an image on a sheet.

Description of the Related Art

There are image forming apparatuses that have an automatic duplex printing function. In such an image forming apparatus, in order to form images on both sides of a sheet, the sheet is conveyed from a sheet storage unit to an image forming portion, an image is formed on one side of the sheet, and then the sheet is reversed and conveyed to the image forming portion again. As discussed in Japanese Patent Application Laid-open No. 2016-99430, an image forming apparatus having such a function includes a plurality of conveyance roller pairs provided in a sheet conveyance path. For example, the plurality of conveyance roller pairs includes a plurality of drive rollers each configured to rotate by receiving a driving force from the image forming apparatus, and a plurality of driven rollers each configured to be rotated by being brought into contact with a corresponding one of the drive rollers.

In this case, however, an image forming apparatus including the plurality of conveyance roller pairs needs to provide space for arranging the plurality of drive rollers each configured to receive a driving force from the image forming apparatus and the plurality of driven rollers each configured to be rotated by a corresponding one of the drive rollers. In addition, there is an issue where the cost of the image forming apparatus increases.

SUMMARY OF THE INVENTION

According to an aspect of the present invention, an image forming apparatus includes an image forming portion at which developer is transferred onto a sheet, a drive roller configured to be rotated by a drive source, a first rotation member disposed in contact with the drive roller and configured to be driven to rotate by the drive roller, the first rotation member and the drive roller forming a first nip portion for nipping the sheet, and a second rotation member disposed in contact with the drive roller at a position different from a position of the first rotation member in a rotation direction of the drive roller, and configured to be driven to rotate by the drive roller, the second rotation member and the drive roller forming a second nip portion for nipping the sheet. The drive roller, the first rotation member, and the second rotation member are arranged so as to move a leading edge of the sheet in a direction approaching the image forming portion in a case where the leading edge passes through the first nip portion, and so as to move the leading edge in a direction apart from the image forming portion in a case where the leading edge passes through the second nip portion. The drive roller, the first rotation member, and the second rotation member are configured to convey the sheet in a state where the sheet is present at the first nip portion and the second nip portion at a same time.

Further features of the present invention will become apparent from the following description of exemplary embodiments with reference to the attached drawings.

DESCRIPTION OF THE EMBODIMENTS

An image forming apparatus 1 according to a first exemplary embodiment of the present invention will be described with reference to FIGS. 1 to 10. In the present exemplary embodiment, a laser beam printer that forms an image on a sheet at an image forming portion using an electrophotographic method is described as an example of the image forming apparatus 1.

Overall Configuration of Image Forming Apparatus

Figure 1:
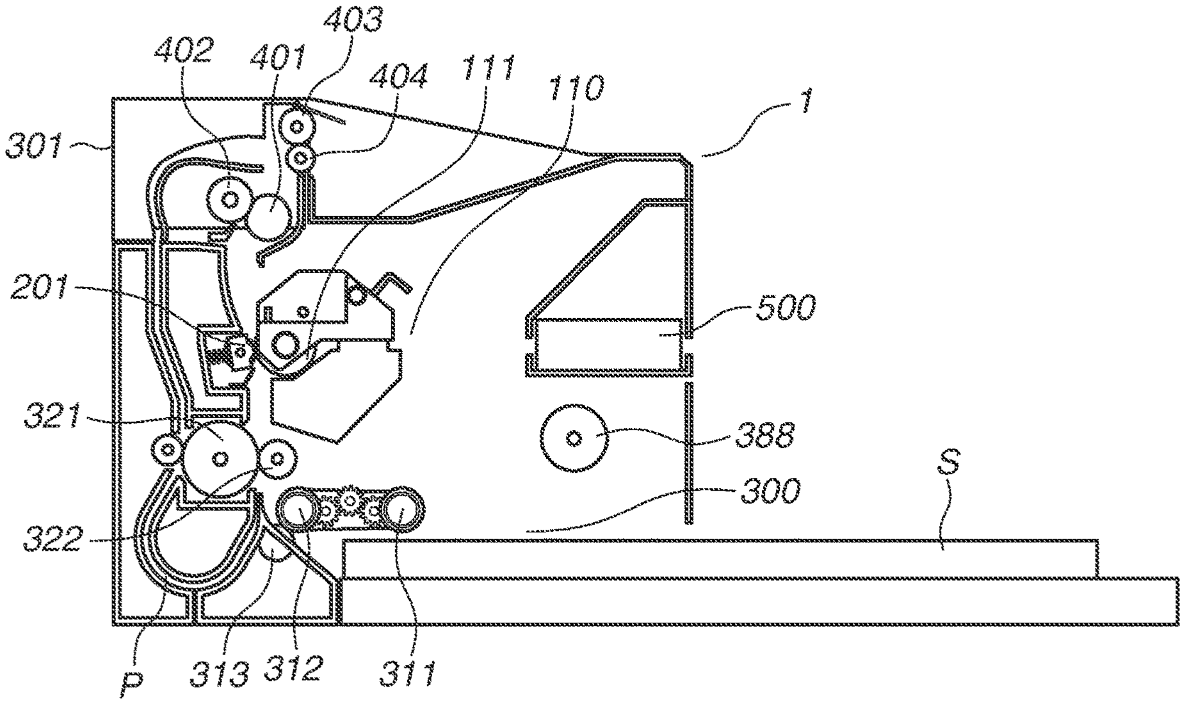
FIG. 1 is a schematic cross-sectional view illustrating an image forming apparatus.

An overall configuration of the image forming apparatus 1 will be described with reference to FIG. 1. FIG. 1 is a schematic cross-sectional view of the image forming apparatus 1.

Sheets S stacked and stored in a sheet storage unit 300 are fed by a pick roller 311. The sheets S are separated one by one by a feed roller 312 and a separation roller 313, and the separated sheet S is conveyed to a first nip portion formed by a drive roller 321 and conveyance driven rollers 322. The sheet S is then conveyed to an image forming portion that is a contact portion at which a photosensitive drum 111 included in a process cartridge 110 and a transfer roller 201 are in contact with each other.

In the present exemplary embodiment, the image forming portion refers to a portion at which toner serving as developer is transferred onto the sheet S.

In the present exemplary embodiment, the contact portion of the photosensitive drum 111 and the transfer roller 201 is the image forming portion. In the case of a configuration using an intermediate transfer belt, a portion at which developer is transferred from the intermediate transfer belt to the sheet S is the image forming portion.

In a case where an image is to be formed on the sheet S, first, a laser scanner unit 500 emits a laser beam to form an electrostatic latent image on the photosensitive drum 111 serving as an image bearing member. The electrostatic latent image is developed by a developing unit (not illustrated) to form a toner image on the photosensitive drum 111. The toner image is then transferred onto the sheet S conveyed to the image forming portion formed by the photosensitive drum 111 and the transfer roller 201.

The sheet S to which the toner image is transferred is conveyed to a fixing portion including a fixing film 401 and a pressure roller 402 that is brought into pressure contact with the fixing film 401. At the fixing portion, the sheet S to which the toner image is transferred is heated and pressured to fix the toner image on the sheet S.

In the case of printing on one side (a first side) of the sheet S, the sheet S on which the toner image is fixed is discharged by a discharging/reversing roller 403 and a discharging/reversing driven roller 404. In the case of printing on both sides of the sheet S, after a trailing edge of the sheet S passes through the fixing portion, the sheet S is conveyed to a duplex conveyance path by switching of a rotation direction of the discharging/reversing roller 403. The sheet S conveyed through the duplex conveyance path is conveyed to the image forming portion again by the drive roller 321, and a toner image is transferred onto a second side of the sheet S. The toner image is then fixed on the sheet S at the fixing portion, and the sheet S is discharged by the discharging/reversing roller 403.

Configuration of Drive Roller

Figure 2A:
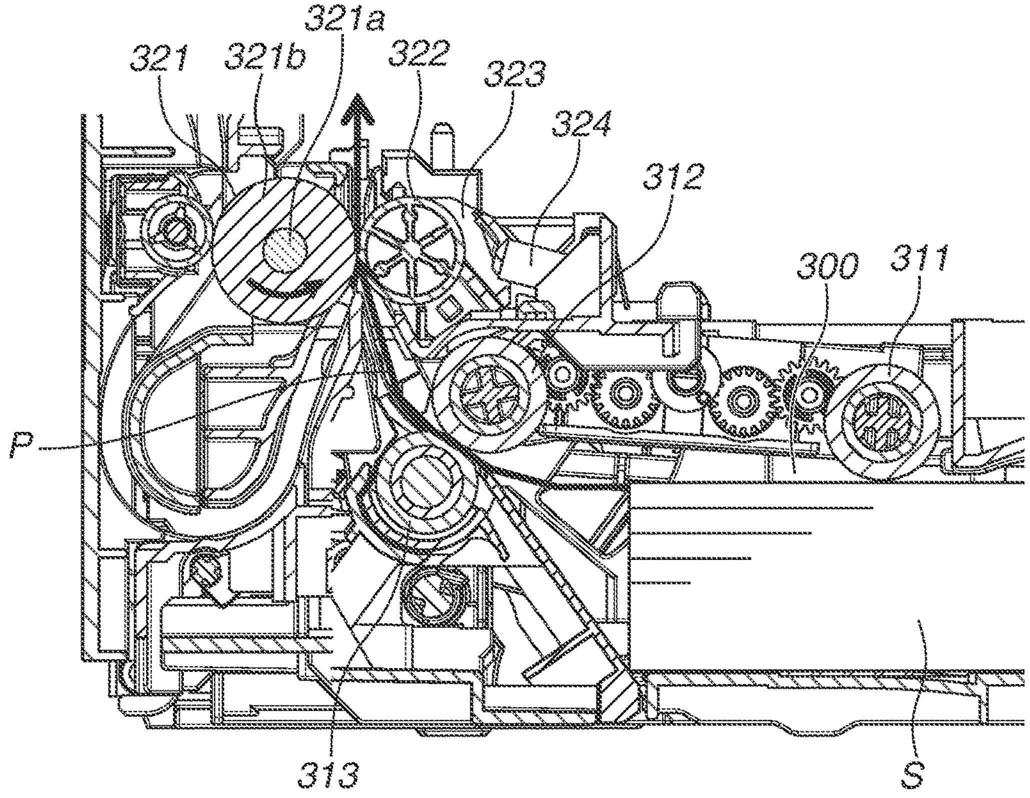
FIGS. 2A and 2B are cross-sectional views each illustrating a drive roller and a vicinity thereof in a state where a door is closed.
Figure 2B:
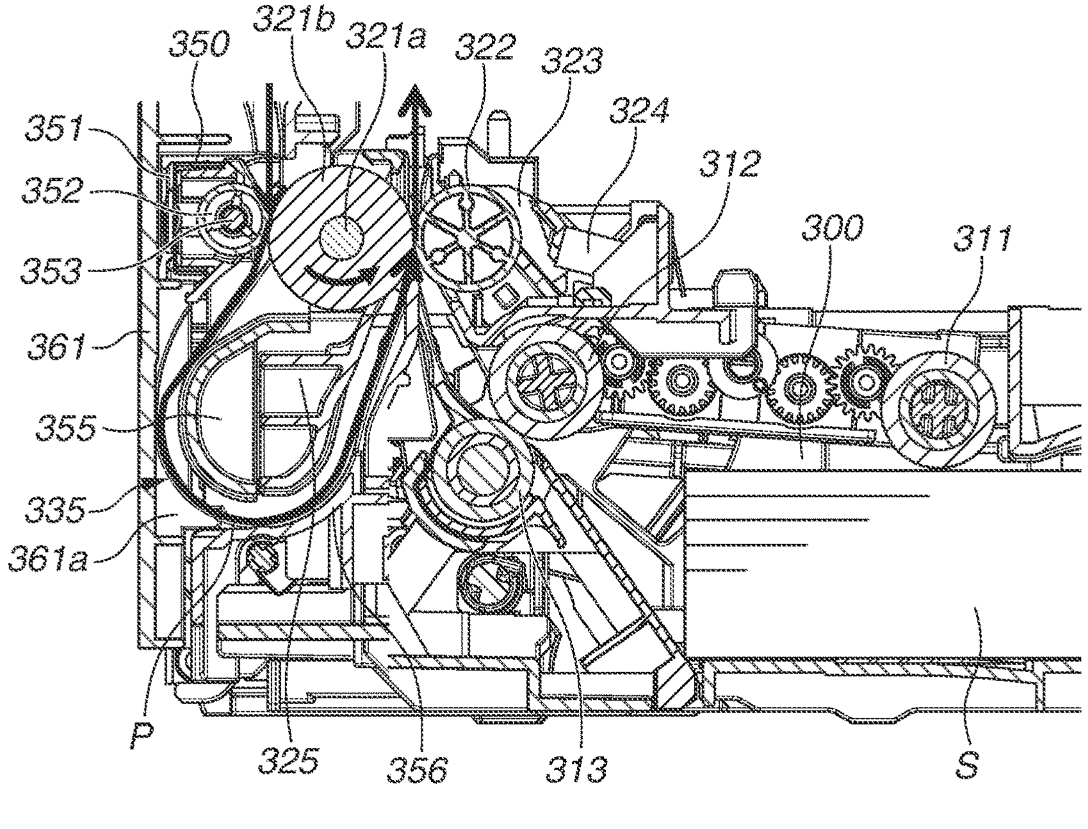
Figure 3A:
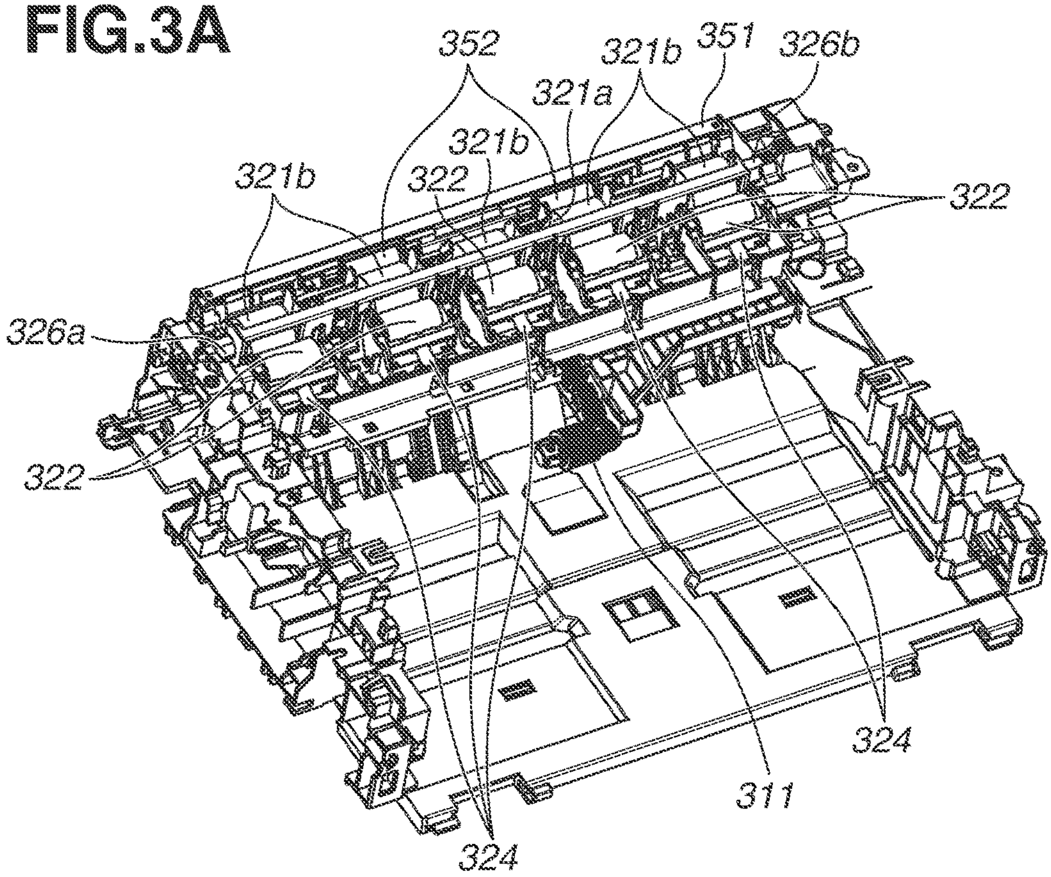
FIGS. 3A and 3B are perspective views each illustrating a configuration of the drive roller.
Figure 3B:
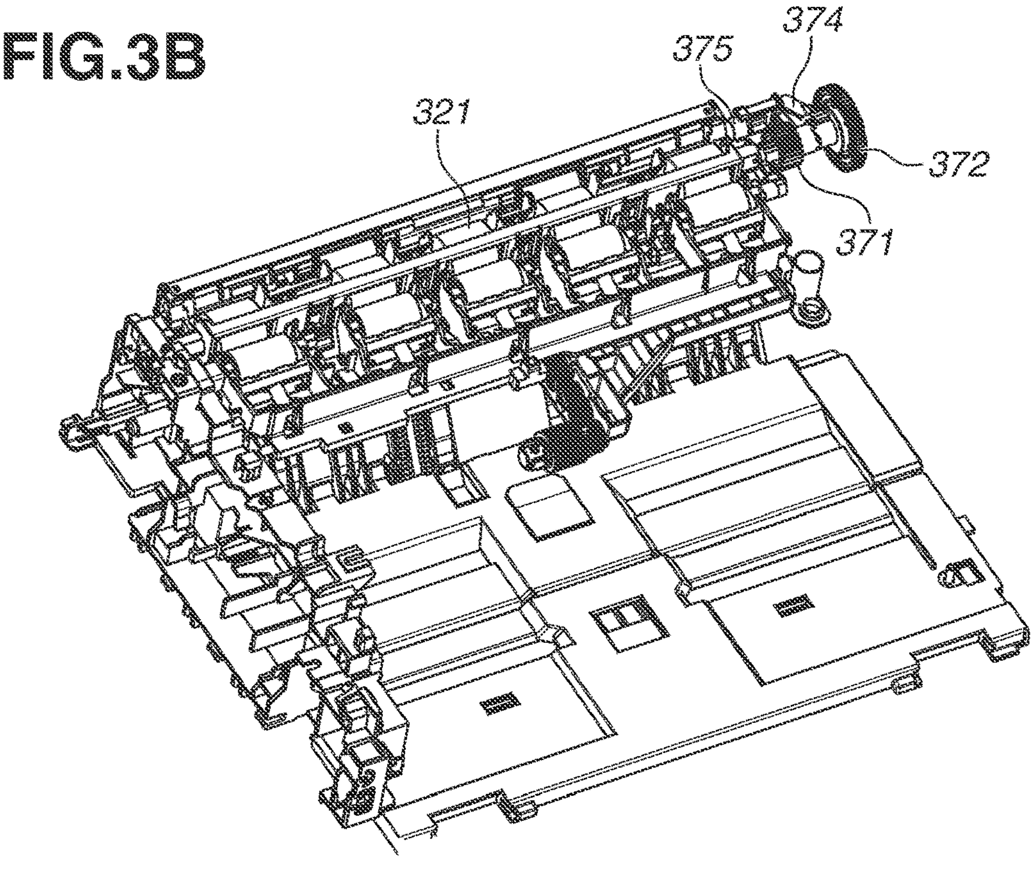
Figure 4:
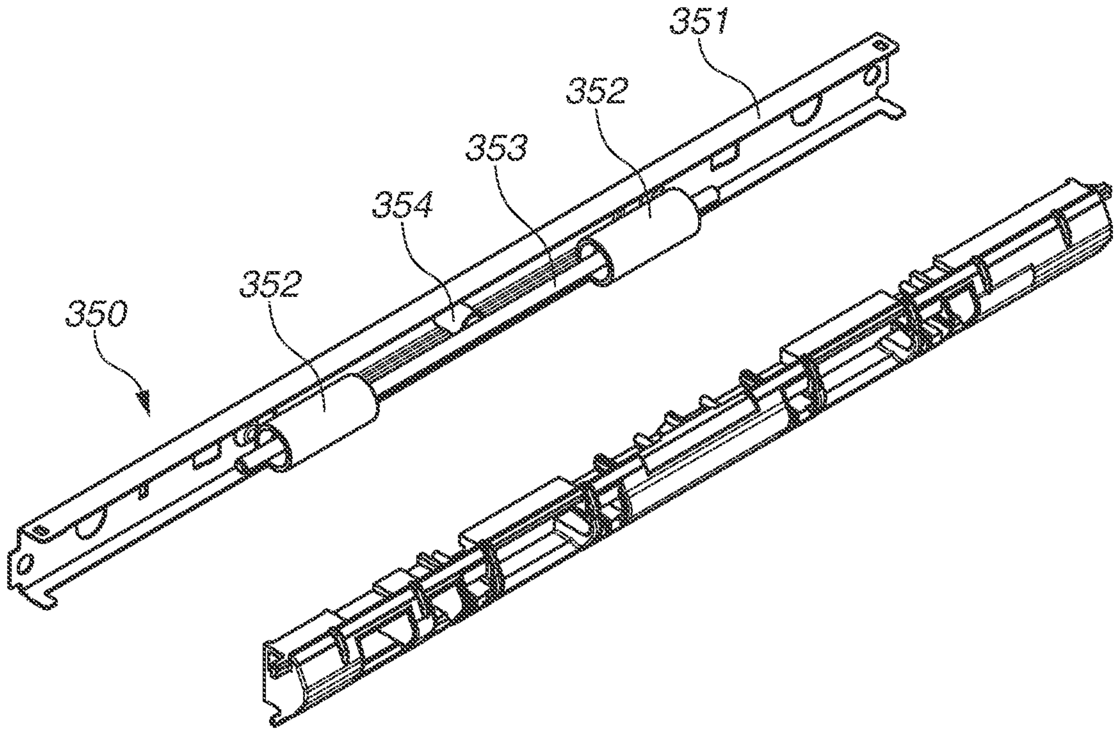
FIG. 4 is a perspective view illustrating a configuration of a duplex driven roller unit.

A configuration of the drive roller 321 will be described with reference to FIGS. 2A to 4. FIG. 2A is a cross-sectional view of the drive roller 321 and a vicinity thereof, and illustrates a sheet conveyance path P of the sheet S fed from the sheet storage unit 300. FIG. 2B is a cross-sectional view of the drive roller 321 and the vicinity thereof, and illustrates the sheet conveyance path P of the sheet S in the case of image formation on both sides of the sheet S. FIG. 3A is a perspective view illustrating a configuration of the drive roller 321. FIG. 3B is a perspective view illustrating the configuration of the drive roller 321 in a state where a drive gear 372 and other components of a drive unit 373 (see FIG. 6A) are attached. FIG. 4 is a perspective view illustrating a configuration of a duplex driven roller unit 350.

As illustrated in FIG. 2A, the drive roller 321 includes a drive shaft 321*a* and rubber rollers 321*b*, and is configured to be rotated only in one direction (a counterclockwise direction in FIG. 2A) by a driving force from a drive source 388 (refer to FIG. 1) included in the image forming apparatus 1. The configuration for rotating the drive roller 321 only in one direction will be described below.

The conveyance driven rollers 322 each serving as a first rotation member are configured to be rotated by the drive roller 321. The conveyance driven rollers 322 are pressed by conveyance pressing members 324 via a conveyance driven roller holder 323, and are rotated together with the drive roller 321 (are driven to rotate by the drive roller 321) while being in contact with the drive roller 321. The conveyance driven rollers 322 and the drive roller 321 form the first nip portion for nipping and conveying the sheet S. The conveyance driven rollers 322 are arranged so as to move a leading edge of the sheet S in a direction approaching the image forming portion when the leading edge of the sheet S passes through the first nip portion.

In the present exemplary embodiment, each of the conveyance pressing members 324 is formed of a metal compression spring. An end portion of the metal compression spring has a shape in which a wire material is extended and in contact with a stay member 451 (refer to FIG. 10) formed of a sheet metal. Thus, the conveyance pressing members 324 are suppressed from being electrically charged due to member-to-member friction.

FIGS. 3A and 3B are perspective views each illustrating the configuration of the drive roller 321. As illustrated in in FIG. 3A, the drive roller 321 includes the plurality of rubber rollers 321*b* provided around the drive shaft 321*a*, and the conveyance driven rollers 322 are respectively in contact with the corresponding rubber rollers 321*b* to form the first nip portion. In the present exemplary embodiment, the five conveyance driven rollers 322 and the five rubber rollers 321*b* form the first nip portion. A drive mechanism of the drive roller 321 will be described below.

A conveyance direction of the sheet S before image formation on the first side is indicated by an arrow in FIG. 2A. The uppermost sheet S of the sheets S stacked in the sheet storage unit 300 is conveyed to the first nip portion by the pick roller 311 and the feed roller 312. The sheet S is conveyed from the first nip portion in a substantially vertical upward direction, and the image formation on the first side is performed at the image forming portion.

FIG. 4 is a perspective view illustrating a configuration of the duplex driven roller unit 350. The duplex driven roller unit 350 is attached to a drive roller guide 325 (refer to FIG. 2B) using a stay 351. Duplex driven rollers 352 each serving as a second rotation member are configured to be pressed by a duplex pressing member 354 via a driven roller shaft 353.

In the present exemplary embodiment, the configuration including the two duplex driven rollers 352 is described, and the two duplex driven rollers 352 are arranged at positions facing two of the five rubber rollers 321*b* of the drive roller 321. The duplex driven rollers 352 each serving as the second rotation member are in contact with the drive roller 321 at positions different from those of the conveyance driven rollers 322 each serving as the first rotation member in a rotation direction of the drive roller 321.

In the present exemplary embodiment, the conveyance driven rollers 322 are larger in diameter than the duplex driven rollers 352. There are two cases where the sheet S is conveyed to the first nip portion formed by the drive roller 321 and the conveyance driven rollers 322. More specifically, there is a case where the sheet S is conveyed to the first nip portion from the sheet storage unit 300, and there is a case where the sheet S is conveyed to the first nip portion from a second nip portion (described below). An angle at which the sheet S enters the first nip portion is different between the two cases. As each of the two types of rollers forming the first nip portion has a larger diameter, the sheet S can be conveyed more stably without being affected by the angle at which the sheet S enters the first nip portion. For this reason, in order to convey the sheet S stably, in the present exemplary embodiment, the conveyance driven rollers 322 are larger in diameter than the duplex driven rollers 352.

As illustrated in FIG. 2B, the duplex driven rollers 352 are in contact with the drive roller 321, and are configured to be rotated by the rotation of the drive roller 321 (are configured to be driven to rotate by the drive roller 321). The duplex driven rollers 352 and the drive roller 321 form the second nip portion for nipping and conveying the sheet S. More specifically, two of the five rubber rollers 321*b*, which are in contact with the duplex driven rollers 352, are each in contact with two rotation members (one conveyance driven roller 322 as the first rotation member and one duplex driven roller 352 as the second rotation member) and form two nip portions (the first nip portion and the second nip portion). The duplex driven rollers 352 are arranged so as to move the leading edge of the sheet S in a direction apart from the image forming portion when the leading edge of the sheet S passes through the second nip portion.

In the present exemplary embodiment, the drive roller 321, the conveyance driven rollers 322, and the duplex driven rollers 352 are disposed below the image forming portion in a vertical direction. When the leading edge of the sheet S passes through the second nip portion formed between the duplex driven rollers 352 and the drive roller 321, the leading edge of the sheet S moves downward in the vertical direction. When the leading edge of the sheet S passes through the first nip portion formed between the conveyance driven rollers 322 and the drive roller 321, the leading edge of the sheet S moves upward in the vertical direction.

The first nip portion is disposed in the sheet conveyance path P through which the sheet S passes before an image is formed on one side of the sheet S. The first nip portion is disposed between the sheet storage unit 300 and the image forming portion in the conveyance direction of the sheet S. The second nip portion is disposed in the sheet conveyance path P through which the sheet S passes during duplex printing for forming images on both sides of the sheet S. More specifically, the second nip portion is disposed in the sheet conveyance path P for conveying the sheet S with an image formed on one side thereof to the image forming portion again.

The drive roller 321 receives pressing forces from the conveyance driven rollers 322 and the duplex driven rollers 352. However, the respective pressing forces act in directions to cancel each other, and bearings 326*a* and 326*b* (refer to FIG. 3A) receive small forces from the drive roller 321. As a result, wear of the bearings 326*a* and 326*b* due to sliding motion with the drive roller 321 is reduced.

In FIG. 2B, the conveyance direction of the sheet S in the case of image formation on the second side is indicated by an arrow. In duplex printing, the sheet S conveyed to the duplex conveyance path by the discharging/reversing roller 403 after the image formation on the first side is conveyed to the second nip portion. A length of the sheet conveyance path P from the second nip portion to the first nip portion is shorter than a length of the sheet S supported in duplex printing by the image forming apparatus 1. Thus, the drive roller 321, the conveyance driven rollers 322, the duplex driven rollers 352 can convey the sheet S in a state where the sheet S is present at the first nip portion and the second nip portion at the same time.

A guide member 335 is provided between the second nip portion and the first nip portion in the sheet conveyance path P to guide the conveyance direction of the sheet S. Because the conveyance direction of the sheet S is largely different between the first nip portion and the second nip portion, the guide member 335 is configured to largely curve the sheet conveyance path P of the sheet S. More specifically, the guide member 335 guides the sheet S so that a moving direction of the leading edge of the sheet S changes from the direction apart from the image forming portion to the direction approaching the image forming portion. In other words, the guide member 335 guides the sheet S from a downward direction to an upward direction with respect to the vertical direction.

An inner side conveyance guide 355 and the drive roller guide 325 form a curved guide shape of the inner side of the guide member 335. In addition, an outer side guide rib 361*a* integrally formed with a door 361 (described below), and an outer side conveyance guide 356 provided in a main body of the image forming apparatus 1 form a curved guide shape of the outer side of the guide member 335.

After the sheet S is conveyed from the second nip portion to the downward direction with respect to the vertical direction along the inner side conveyance guide 355, the sheet S is bent by the outer side guide rib 361*a* and the outer side conveyance guide 356, and conveyed to the first nip portion while the conveyance direction is changed to the upward direction with respect to the vertical direction.

In this case, in the sheet conveyance path P, while the sheet S is present at the second nip portion and first nip portion at the same time, the sheet S is conveyed in substantially opposite directions at the second nip portion and first nip portion. The sheet S is then conveyed to the image forming portion to form an image on the second side of the sheet S.

Effect of Guide Member of Sheet Conveyance Path P

Curvature of the curve of the sheet conveyance path P in the guide member 335 is determined by the inner side guide shape and the outer side guide shape. In the case of a configuration in which no inner side guide is provided in the guide member 335, the sheet conveyance path P in the guide member 335 is formed by an outer periphery of the drive roller 321 and the outer side guide shape. Accordingly, curvature of the guide member 335 is determined by an outer diameter of the drive roller 321. To achieve stable sheet conveyance, the curvature of the curved portion of the sheet conveyance path P is to be made larger to reduce conveyance resistance of the sheet S with particularly strong stiffness. On the other hand, increasing the outer diameter of the drive roller 321 leads to an adverse effect such as a cost increase. The configuration according to the present exemplary embodiment achieves stable sheet conveyance by providing guide shapes on the inner side and the outer side of the guide member 335 while the outer diameter of the drive roller 321 is kept small.

Effect of Prevention of Image Defect

A conveyance speed of the sheet S at each of the first nip portion and the second nip portion depends on a peripheral speed of the drive roller 321. In a conventional configuration in which at least two drive rollers are provided, in order to eliminate manufacturing variation (dimensional tolerance) between outer diameters of the two drive rollers, accurate machining is performed and this leads to a cost increase.

It is also conceivable that wear occurs in the drive rollers due to the conveyance of the sheet S, and wear amounts of the two drive rollers differ. For this reason, there is a possibility that a difference in peripheral speed between the two drive rollers may increase through the use of the image forming apparatus. If there is a difference in peripheral speed between the two drive rollers, i.e., a difference in sheet conveyance speed between the two nip portions, there is a possibility that the sheet S may be slack or pulled and an image defect may occur due to the sheet S being rubbed strongly against the guide member.

On the other hand, in the configuration according to the present exemplary embodiment, since the two nip portions are formed using the single drive roller 321, the difference in sheet conveyance speed between the two nip portions is unlikely to occur even if wear occurs in the drive roller 321 due to the manufacturing variation of the drive roller 321 or the use of the image forming apparatus 1. This makes it possible to suppress the sheet S from being excessively slack or pulled, thereby preventing image defects.

Jam Clearance Operability

Figure 5:
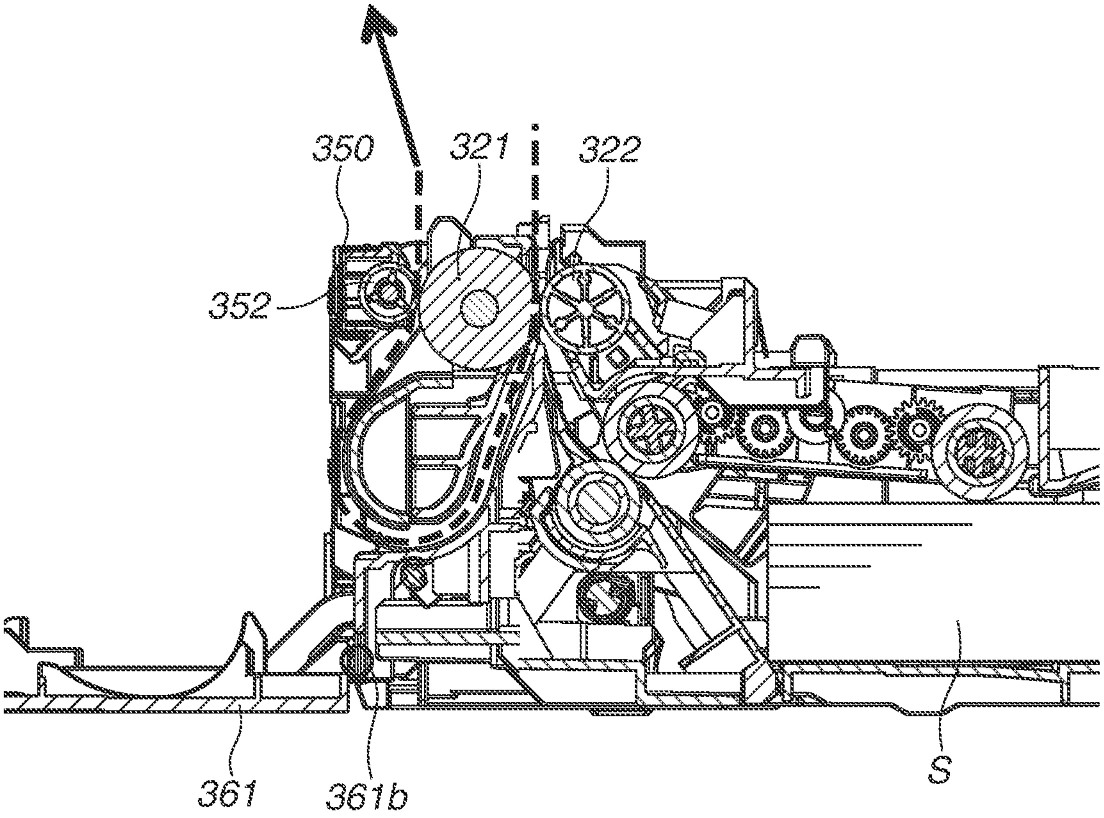
FIG. 5 is a cross-sectional view illustrating the drive roller and the vicinity thereof in a state where the door is open.

Jam clearance operability of the image forming apparatus 1 according to the present exemplary embodiment will be described with reference to FIG. 5. FIG. 5 is a cross-sectional view illustrating the drive roller 321 and the vicinity thereof in a state where the door 361 is opened.

The image forming apparatus 1 includes the door 361 and a main body frame 301 (refer to FIG. 1) that accommodates the image forming portion, as a housing of the image forming apparatus 1. The door 361 is provided to be openable and closable between an open state and a closed state, around a door rotation shaft 361*b* (refer to FIG. 5) with respect to the main body frame 301. When the door 361 is in the open state, the sheet conveyance path P is exposed, so that the user can remove the jammed sheet S.

The duplex driven roller unit 350 is held by the drive roller guide 325, and thus the duplex driven rollers 352 and the drive roller 321 form the second nip portion even when the door 361 is in the open state. In the configuration according to the present exemplary embodiment, a press-contact force at the second nip portion is applied to the main body of the image forming apparatus 1 and is not applied to the door 361. Thus, compared with a case where the press-contact forces of the duplex driven rollers 352 are applied to the door 361, it is possible to reduce the stiffness of the door 361 and a holding force for holding the closed state of the door 361. Thus, the shape and the holding mechanism thereof can be simplified, which contributes to cost reduction.

In the present exemplary embodiment, if a jam occurs, the user can open the door 361 to perform a jam clearance operation as indicated by a dotted line in FIG. 5. However, in a state where a driving force is transmitted from the drive source 388 to the drive roller 321, a large force is to be applied to pull out the sheet S nipped by the drive roller 321.

To address the issue, in the configuration according to the present exemplary embodiment, when the door 361 is in the open state, the transmission of a driving force from the drive source 388 to the drive roller 321 is released to improve the jam clearance operability of the user. Because of the release of transmission of a driving force from the drive source 388 to the drive roller 321, in a case where the user tries to pull out the jammed sheet S toward an upstream conveyance direction (a direction indicated by an arrow in FIG. 5), the drive roller 321 can be easily rotated by the movement of the jammed sheet S. Thus, it is possible to perform the jam clearance operation with a small force. Also in a case where the user tries to pull out the jammed sheet S toward a downstream conveyance direction, the drive roller 321 can be easily rotated. Thus, it is possible to perform the jam clearance operation with a small force.

Method for Transmission of Driving force to Drive Roller

Figure 6A:
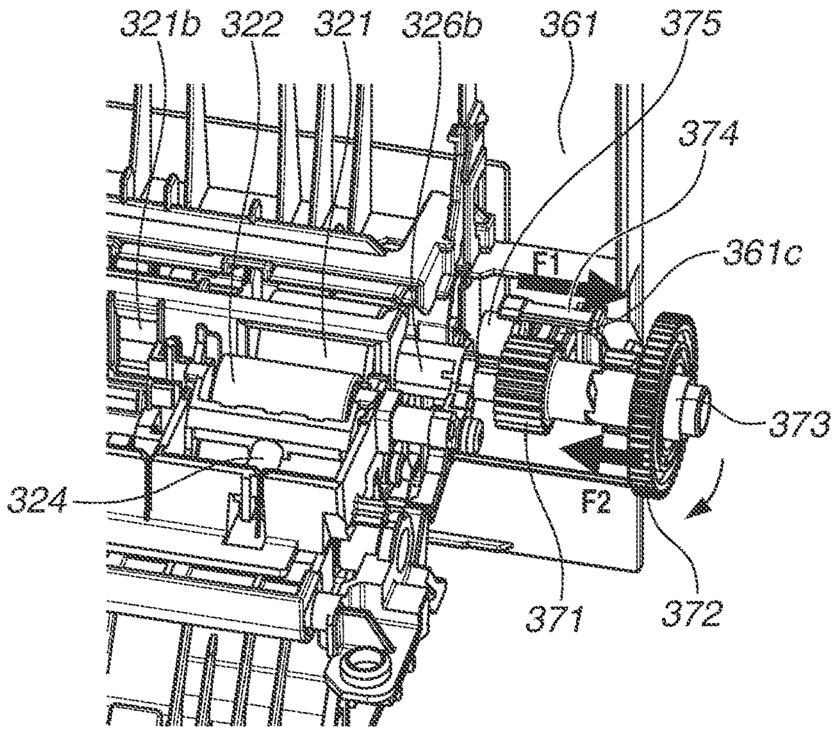
FIGS. 6A and 6B are perspective views each illustrating a configuration of a drive release mechanism.
Figure 6B:
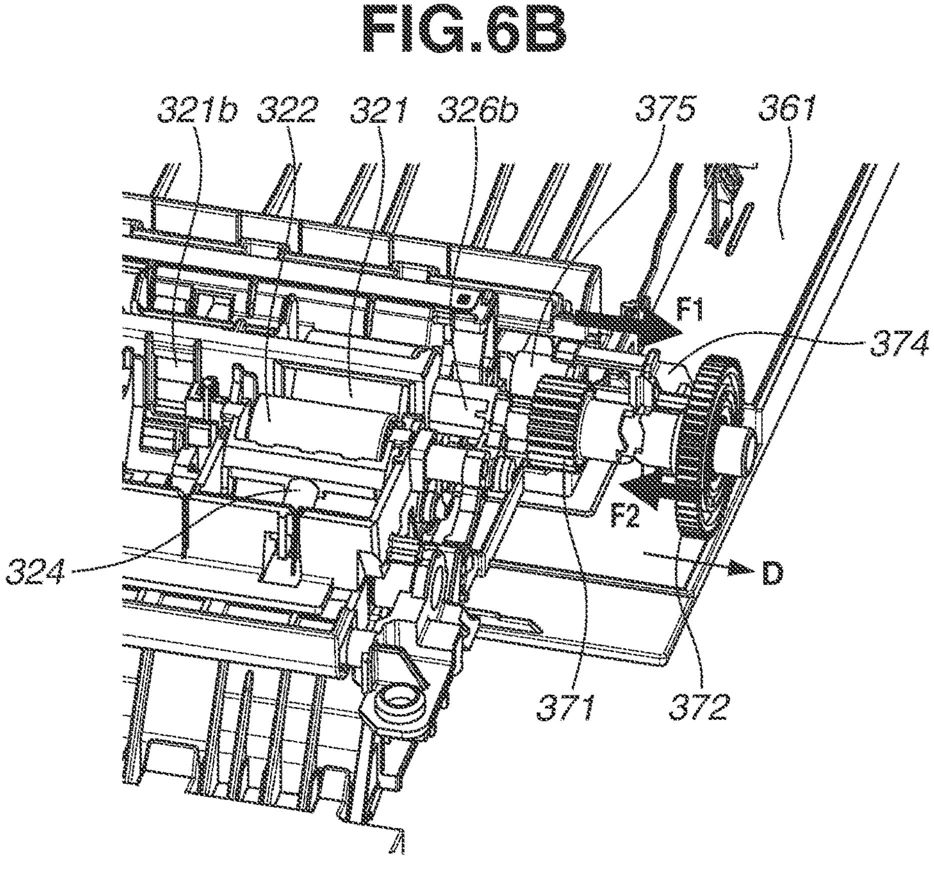
Figure 7A:
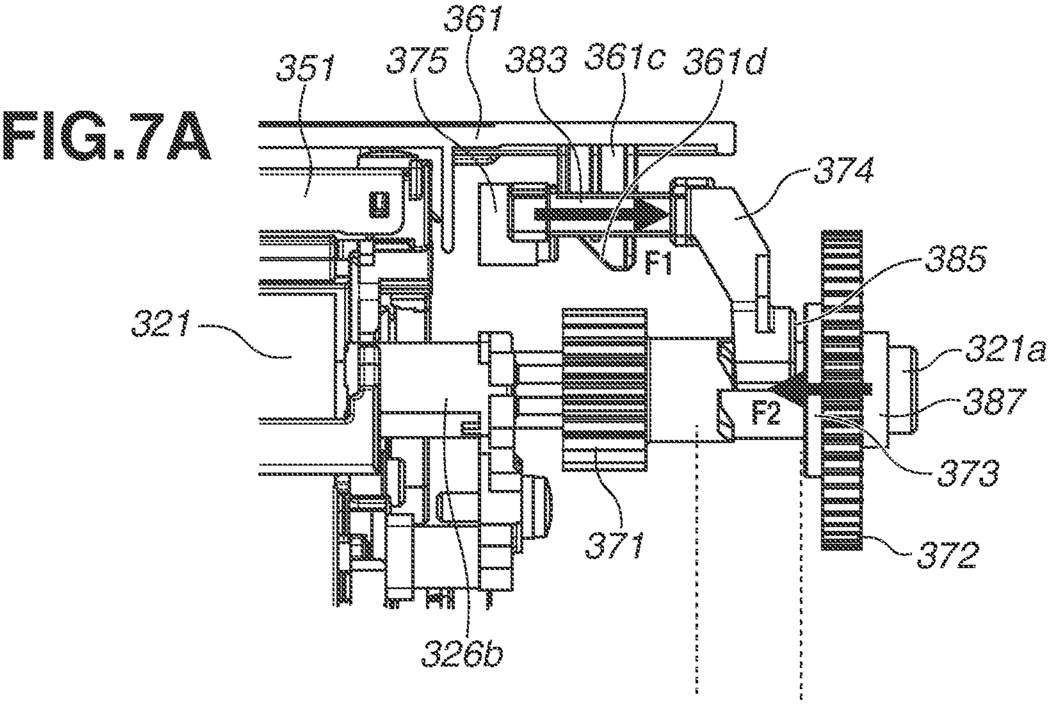
FIGS. 7A and 7B are cross-sectional views each illustrating the drive release mechanism.
Figure 7B:
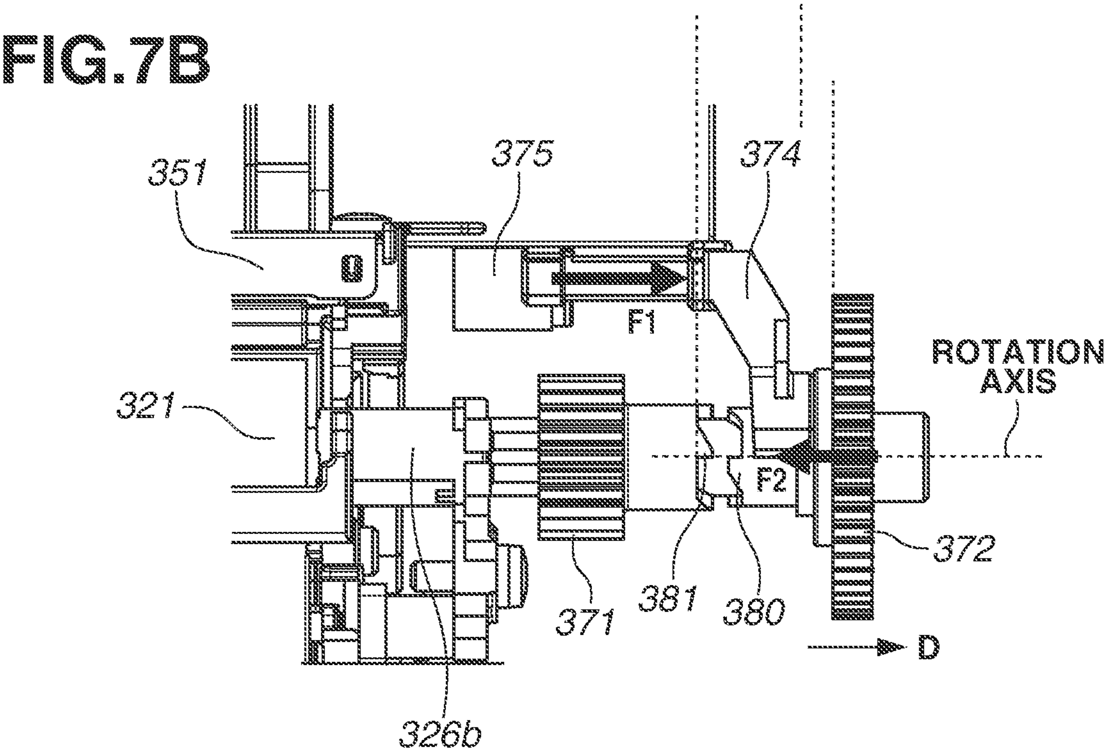

A method for transmitting a driving force to the drive roller 321 will be described with reference to FIGS. 6A and 6B and FIGS. 7A and 7B. FIGS. 6A and 6B are perspective views each illustrating a configuration of a drive release mechanism. FIGS. 7A and 7B are cross-sectional views each illustrating the configuration of the drive release mechanism. In the configuration according to the present exemplary embodiment, when the door 361 is in the closed state as illustrated in FIGS. 6A and 7A, a driving force is transmitted from the drive source 388 to the drive roller 321, and when the door 361 is in the open state as illustrated in FIGS. 6B and 7B, a driving force is not transmitted from the drive source 388 to the drive roller 321.

As illustrated in FIGS. 7A and 7B, the drive source 388 transmits a driving force to a drive gear 372, and the driving force is transmitted to the drive roller 321 via a drive transmission member 380 and a driven transmission member 381. The drive gear 372, the drive transmission member 380, the driven transmission member 381, the drive roller 321, and the drive shaft 321*a* are provided on the same rotation shaft. The driven transmission member 381 and the drive roller 321 are rotated together with the drive shaft 321*a*.

The drive unit 373 is held to be slidable with respect to the drive shaft 321*a* in a rotation axis direction. The drive unit 373 includes the drive gear 372 and receives a driving force from the drive source 388. The drive unit 373 is urged by a second urging member 387 in a direction approaching the drive roller 321 with respect to the rotation axis direction, with an urging force F2 (a second urging force) smaller than an urging force F1. In the present exemplary embodiment, a spring is used for the second urging member 387.

The drive transmission member 380 and the driven transmission member 381 have a ratchet shape. Thus, the drive transmission member 380 transmits a driving force for rotating the sheet S in the conveyance direction to the driven transmission member 381, but does not transmit a driving force for rotating the sheet S in the opposite direction.

In the state illustrated in FIGS. 6A and 7A where the door 361 is in the closed state, the drive transmission member 380 of the drive unit 373 and the driven transmission member 381 of the drive shaft 321*a* are engaged with each other. Thus, when the drive source 388 transmits a driving force to the drive gear 372, the drive transmission member 380 transmits the driving force to the driven transmission member 381 to rotate the drive shaft 321*a*. In other words, the drive unit 373 includes the drive transmission member 380 that transmits the driving force received from the drive source 388 to the drive shaft 321*a*. The drive shaft 321*a* includes the driven transmission member 381 that receives the driving force from the drive transmission member 380.

On the other hand, in the state illustrated in FIGS. 6B and 7B where the door 361 is in the open state, since the drive transmission member 380 and the driven transmission member 381 are not engaged with each other, the driving force received by the drive gear 372 from the drive source 388 is not transmitted to the driven transmission member 381. Accordingly, the drive shaft 321*a* does not rotate, and thus the drive roller 321 does not rotate either.

Gear teeth formed on a downstream transmission gear 371 are configured to transmit the driving force to the further downstream side, and do not contribute to the driving force transmission to the drive roller 321.

Operation of Drive Release Mechanism for Drive Roller

Figure 8:
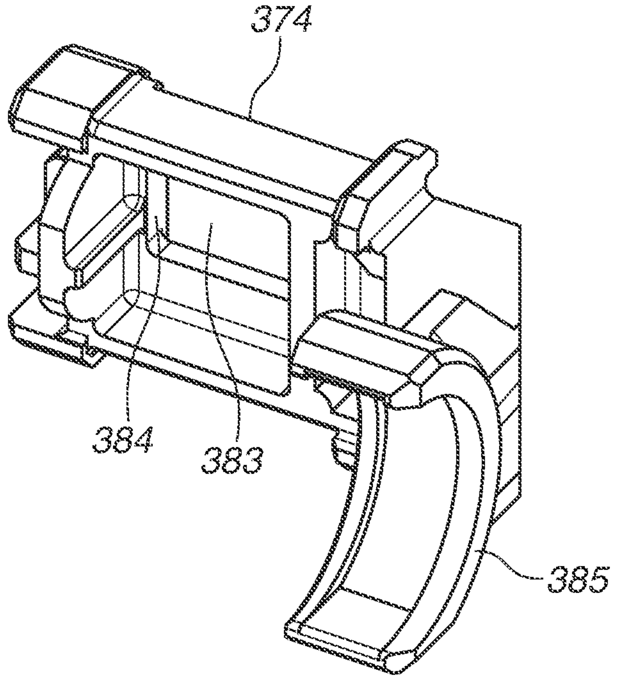
FIG. 8 is a perspective view illustrating a drive release member.
Figure 9:
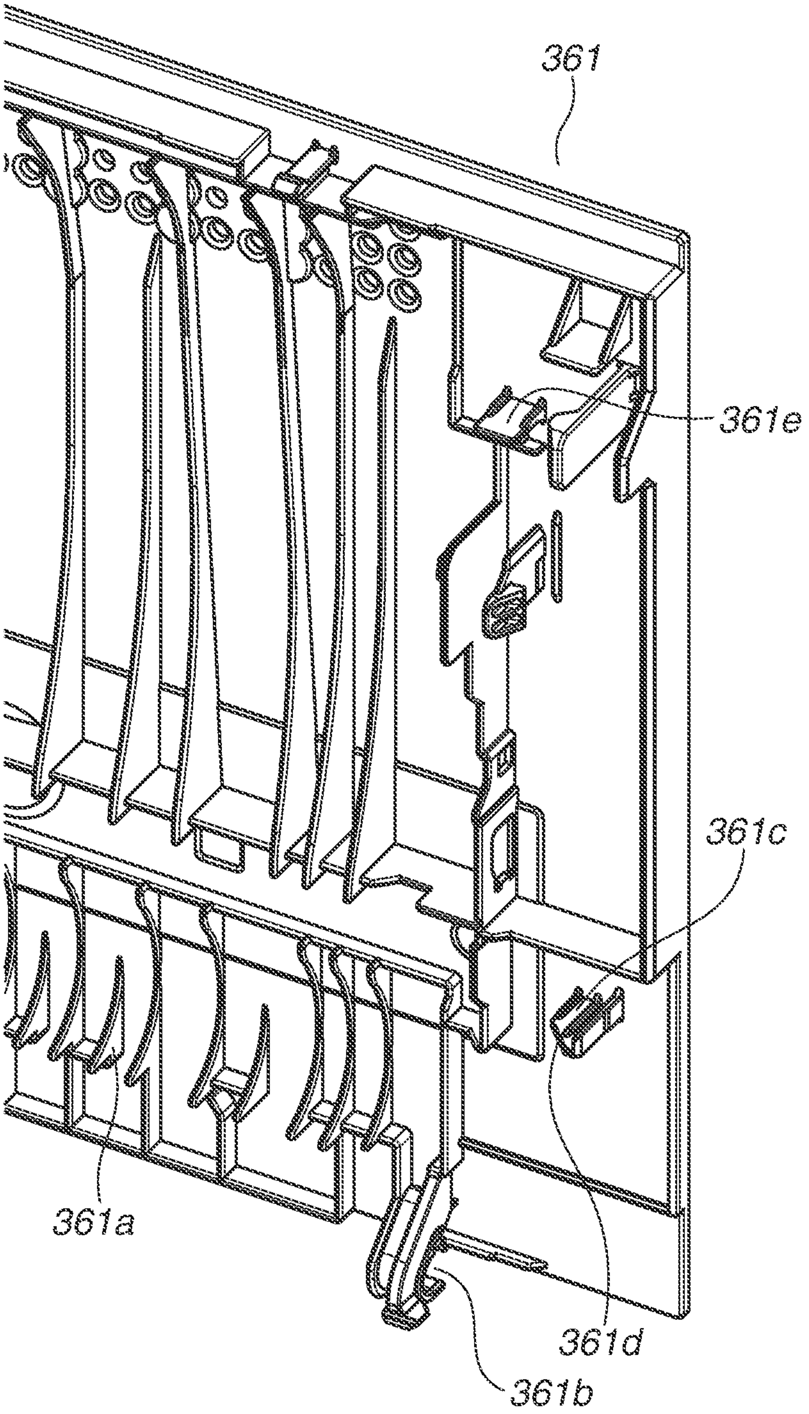
FIG. 9 is perspective view illustrating the door.

As described above, whether to transmit the driving force from the drive gear 372 to the drive roller 321 is determined based on whether the door 361 is in the open state or the closed state, i.e., whether the drive transmission member 380 and the driven transmission member 381 are engaged with each other. Next, a description will be given of how the drive transmission member 380 and the driven transmission member 381 are engaged and the engagement thereof is released in each of the open state and the closed state of the door 361. FIG. 8 is a perspective view illustrating a drive release member 374, and FIG. 9 is a perspective view illustrating the door 361.

As illustrated in FIG. 8, an opening 383 and a pressing surface 385 are formed in the drive release member 374. A receiving surface 384 is formed on a side surface of the opening 383. As illustrated in FIG. 9, a pressure receiving portion 361*c* is formed on the door 361. The transmission of the driving force to the drive roller 321 is released by the drive release member 374 and the pressure receiving portion 361*c* of the door 361. The drive release member 374 releases the transmission of the driving force by releasing the engagement of the drive transmission member 380 and the driven transmission member 381.

First, an operation performed when the door 361 is in the closed state will be described with reference to FIGS. 6A and 7A. When the door 361 is in the closed state, a driving force is transmitted from the drive source 388 to the drive roller 321. The drive release member 374 is held to be slidable in the rotation axis direction of the drive roller 321.

An end portion of the drive release member 374 is urged by a first urging member 375 with the urging force F1 (the first urging force). The direction of the urging force F1 is a direction from the drive roller 321 toward the drive gear 372 with respect to the rotation axis direction of the drive roller 321. In other words, the image forming apparatus 1 urges the drive release member 374 with the first urging force in a direction apart from the drive roller 321 with respect to the rotation axis direction. In the present exemplary embodiment, a spring is used for the first urging member 375.

When the door 361 is in the closed state, the pressure receiving portion 361*c* provided on the door 361 and the receiving surface 384 of the drive release member 374 are in contact with each other. Thus, the urging force F1 applied to the drive release member 374 is received by the pressure receiving portion 361*c* to regulate the sliding movement of the drive release member 374. Thus, the drive unit 373 receives the urging force F2 in a direction approaching the drive roller 321 with respect to the rotation axis direction, and the drive transmission member 380 and the driven transmission member 381 are engaged with each other.

In this way, when the door 361 is in the closed state, the driving force received by the drive gear 372 is transmitted to the drive shaft 321*a* and the drive roller 321. In this state, there is a space between the pressing surface 385 and the drive unit 373. On the other hand, when the door 361 is in the open state, the drive release member 374 urges the drive unit 373 in the direction apart from the drive roller 321 with respect to the rotation axis direction.

Next, driving force transmission in case where the door 361 is in the open state will be described with reference to FIGS. 6B and 7B. When the door 361 is in the open state, a driving force is not transmitted from the drive source 388 to the drive roller 321. When the door 361 is in the open state, the pressure receiving portion 361*c* is retracted from the opening 383 of the drive release member 374.

Accordingly, the drive release member 374 is urged with the urging force F1 in a direction from the drive roller 321 toward the drive gear 372 with respect to the rotation axis direction. The drive release member 374 is also urged with the urging force F2 in a leftward direction in FIGS. 7A and 7B. The relationship between the urging forces F1 and F2 is as follows:

$$F1>F2$$

Thus, the drive release member 374 slides in the direction from the drive roller 321 toward the drive gear 372 with respect to the rotation axis direction. This causes the drive unit 373 to slide in the direction from the drive roller 321 toward the drive gear 372 with respect to the rotation axis direction. Accordingly, the engagement of the drive transmission member 380 and the driven transmission member 381 is released, so that a driving force is not transmitted from the drive source 388 to the drive shaft 321*a* and the drive roller 321. In this way, when the door 361 is in the open state, the driving force received by the drive gear 372 is not transmitted to the drive shaft 321*a* and the drive roller 321.

Door State Erroneous Detection Prevention Function

Figure 10:
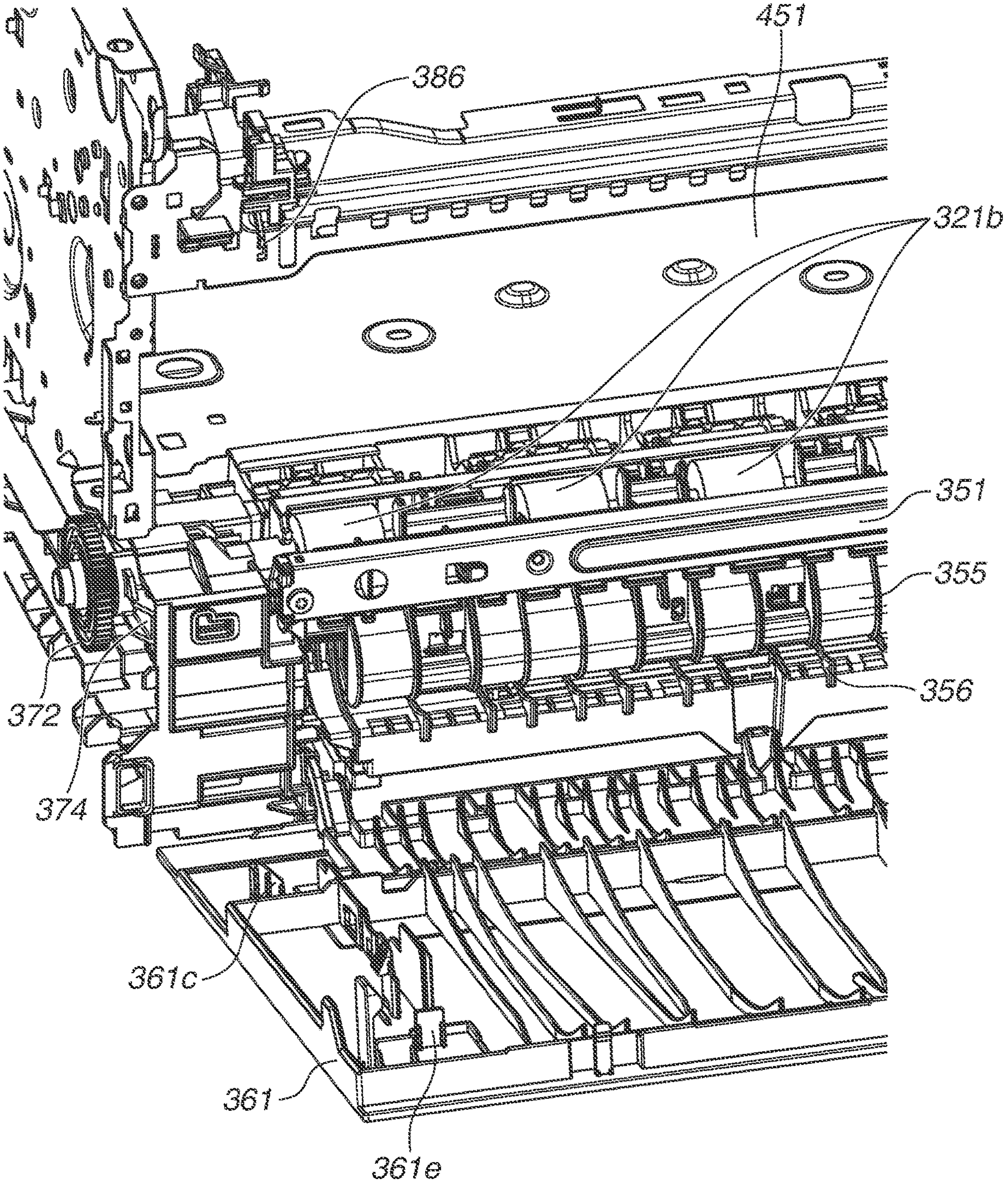
FIG. 10 is a perspective view illustrating a back side of the image forming apparatus.

A description will be given of a function of preventing erroneous detection of the open state or the closed state of the door 361 in the configuration according to the present exemplary embodiment, with reference to FIGS. 9 and 10. FIG. 9 is a perspective view of the door 361. FIG. 10 is a perspective view of the image forming apparatus 1 seen from the back side thereof.

As illustrated in FIG. 9, the door 361 is provided with a detection rib 361*e*. A slope portion 361*d* sloped with respect to the urging force F1 is formed on the pressure receiving portion 361*c*. As illustrated in FIG. 10, the image forming apparatus 1 is provided with a sensor member 386 capable of detecting the closed state of the door 361. When the door 361 is in the closed state, the closed state of the door 361 is detected by the sensor member 386 detecting the detection rib 361*e* provided on the door 361.

Normally, the image forming apparatus 1 permits printing when the door 361 is in the closed state. However, if the sensor member 386 erroneously detects the closed state of the door 361 even though the door 361 is not actually in the closed state, the image forming apparatus 1 may start printing. Since the door 361 forms a part of the duplex conveyance path, if the image forming apparatus 1 starts printing when the door 361 is not in the closed state, jamming may occur during duplex printing because the duplex conveyance path is not formed in a normal manner Thus, in one embodiment, the erroneous detection of the open state or the closed state of the door 361 can be prevented.

As an example of the erroneous detection of the state of the door 361, the following state is conceivable. The door 361 is slightly open with respect to the closed state, and the sensor member 386 detects the detection rib 361*e* but the guide member of the door 361 does not function sufficiently as the guide for the sheet S.

With the configuration according to the present exemplary embodiment, such erroneous detection can be prevented. When the user performs an operation for changing the door 361 from the open state to the closed state (hereinafter referred to as a closing operation), the drive release member 374 moves in a direction against the urging force F1 with respect to the rotation axis direction while the receiving surface 384 is in contact with the slope portion 361*d* of the door 361.

At this time, if the user stops the closing operation in the middle or the door 361 is not completely closed, the door 361, which is in a state between the open state and the closed state, is pushed back in a direction toward the open state by the slope portion 361*d* receiving the urging force F1. Thus, the sensor member 386 does not detect the detection rib 361*e*, thereby making it possible to prevent the erroneous detection of the closed state of the door 361.

As another example of the erroneous detection, a case is conceivable where the sensor member 386 detects the detection rib 361*e* but the pressure receiving portion 361*c* does not press the drive release member 374 due to the deformation (the distortion, or the bending) of the door 361. In this state, even in a situation where the drive source 388 is to transmit a driving force to the drive roller 321, the transmission of a driving force is not possible.

To prevent the situation, as illustrated in FIG. 10, the pressure receiving portion 361*c* and the detection rib 361*e* of the door 361 are disposed on the same side with respect to a sheet conveyance region in a sheet width direction. With this configuration, the image forming apparatus 1 reduces the possibility of erroneously detecting the open state or the closed state of the door 361 due to the deformation of the door 361. The pressure receiving portion 361*c* and the detection rib 361*e* of the door 361 are disposed outside the sheet conveyance region in the sheet width direction.

As described above, according to the present exemplary embodiment, the duplex driven rollers 352 and the conveyance driven rollers 322 are brought into contact with the drive roller 321 to form the two nip portions. Therefore, the number of drive rollers that receive a driving force from the drive source 388 can be reduced. In addition, the size reduction and cost reduction of the main body of the image forming apparatus 1 are achieved by the space saving.

Furthermore, since the sheet S is conveyed at the two nip portions by the same drive roller 321, the difference in the conveyance speed of the sheet S between the two nip portions is unlikely to occur. This makes it possible to suppress the sheet S, which is being conveyed between the two nip portions, from being excessively slack or pulled, thereby preventing image defects.

Moreover, even in a state where the closing operation of the door 361 is not completely performed, the erroneous detection of the state of the door 361 can be prevented by the drive release mechanism for the drive roller 321.

In the configuration according to the first exemplary embodiment where the duplex driven rollers 352 and the conveyance driven rollers 322 are brought into contact with the drive roller 321 to form the two nip portions, it is also possible to provide a mechanism for correcting an inclination of the sheet S in the conveyance direction (hereinafter referred to as a skew of the sheet S). In a second exemplary embodiment, a description will be given of a configuration in which a regulation member 331 is provided on a downstream side of the pick roller 311 and an upstream side of the image forming portion in the conveyance direction of the sheet S in order to regulate the leading edge of the sheet S to correct the skew of the sheet S, with reference to FIGS. 11A and 11B. An overall configuration of the image forming apparatus 1 according to the present exemplary embodiment is similar to that according to the first exemplary embodiment, and thus the description thereof will be omitted. The image forming apparatus 1 according to the present exemplary embodiment will be described with reference to FIGS. 11A and 11B.

Figure 11A:
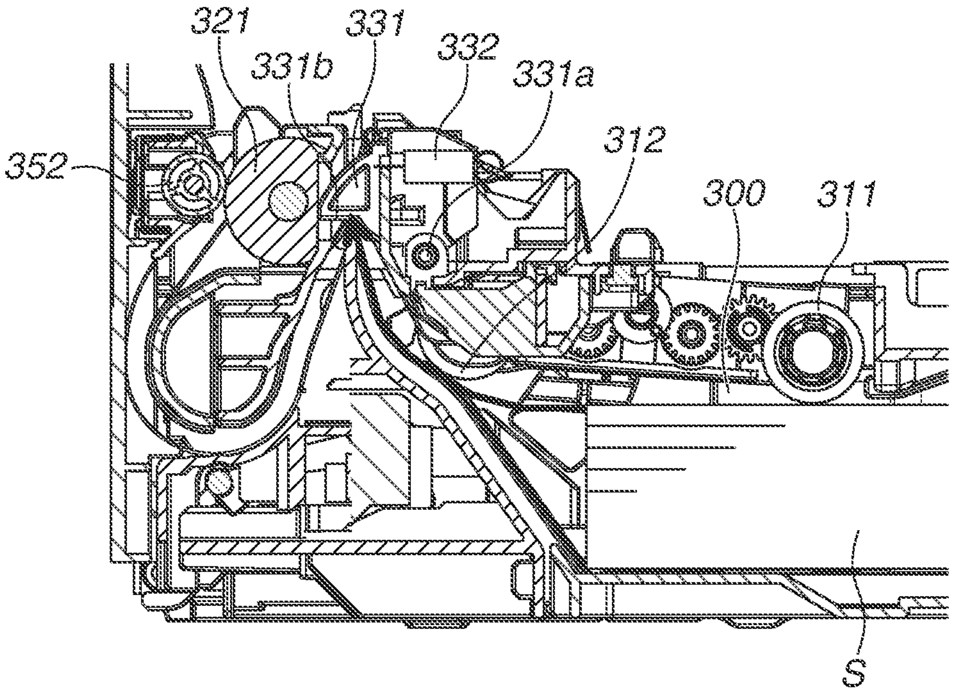
FIGS. 11A and 11B are cross-sectional views each illustrating a regulation member and a vicinity thereof.
Figure 11B:
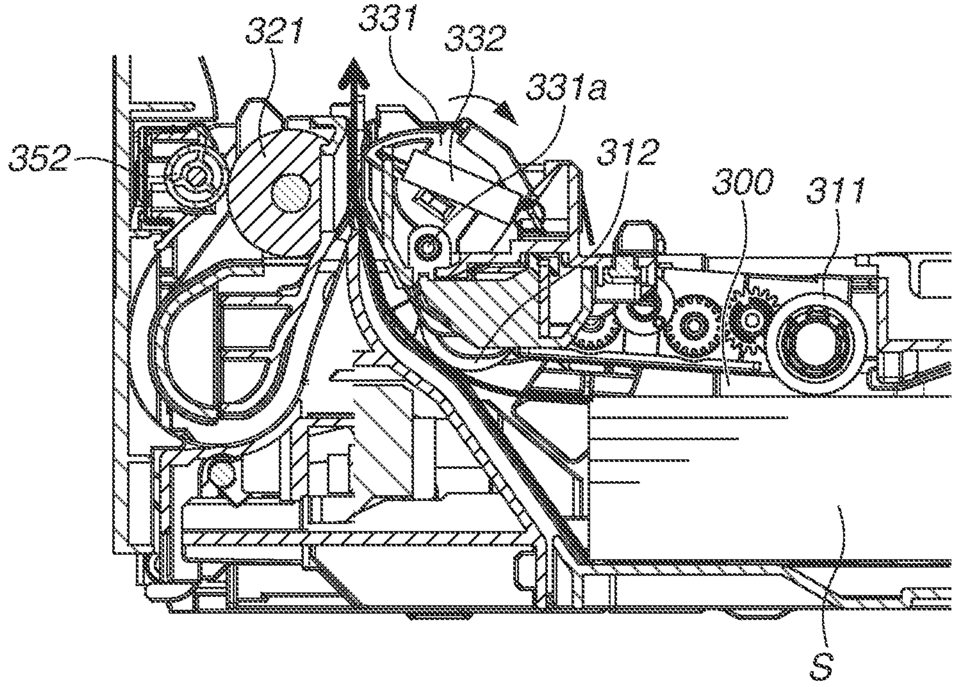

FIGS. 11A and 11B are cross-sectional views each illustrating the regulation member 331 and a vicinity thereof. A configuration for forming the first nip portion and the second nip portion is similar to that according to the first exemplary embodiment, and thus the description thereof will be omitted. The regulation member 331 for regulating the leading edge of the sheet S in the conveyance direction of the sheet S is provided on an upstream side of the first nip portion in the conveyance direction. The regulation member 331 is held to be rotatable around a shaft 331*a* and urged by an urging member 332 in a counterclockwise direction in FIGS. 11A and 11B. A plurality of correction surfaces 331*b* is located on the upstream side of the first nip portion in the conveyance direction, and arranged to be bilaterally symmetrical in the width direction of the sheet S.

As illustrated in FIG. 11A, the uppermost sheet S of the sheets S stacked in the sheet storage unit 300 is conveyed to the first nip portion by the pick roller 311 and the feed roller 312. Two different places at the leading edge of the sheet S make contact with the correction surfaces 331*b* of the regulation member 331 in the conveyance direction, and a position of the leading edge of the sheet S is regulated by the two places in the conveyance direction, so that the skew of the sheet S is corrected. Then, as illustrated in FIG. 11B, the regulation member 331 is rotated in a clockwise direction in FIG. 11B by being pressed by the sheet S, so that the sheet S is conveyed to the first nip portion.

Behavior of the sheet S in a period from the image formation on the first side to the image formation on the second side is similar to that according to the first exemplary embodiment.

As described above, according to the present exemplary embodiment, the regulation member 331 is provided on the downstream side of the pick roller 311 and the upstream side of the image forming portion in the conveyance direction of the sheet S in order to regulate the leading edge of the sheet S in the conveyance direction of the sheet S, in addition to the configuration according to the first exemplary embodiment. This makes it possible to correct the skew of the sheet S to be conveyed to the image forming portion and thereby accurately form an image on the sheet S.

According to the exemplary embodiments of the present invention, the size of an image forming apparatus can be reduced by bringing a plurality of driven rollers into contact with one drive roller so as to convey a sheet in different conveyance directions. Cost reduction can also be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-122287, filed Jul. 27, 2021, which is hereby incorporated by reference herein in its entirety.

What is claimed is:

1. An image forming apparatus comprising:

an image forming portion at which developer is transferred onto a sheet;

a drive roller configured to be rotated by a drive source;

a first rotation member disposed in contact with the drive roller and configured to be driven to rotate by the drive roller, the first rotation member and the drive roller forming a first nip portion for nipping the sheet; and a second rotation member disposed in contact with the drive roller at a position different from a position of the first rotation member in a rotation direction of the drive roller, and configured to be driven to rotate by the drive roller, the second rotation member and the drive roller forming a second nip portion for nipping the sheet, wherein the drive roller, the first rotation member, and the second rotation member are arranged so as to move a leading edge of the sheet in a direction approaching the image forming portion in a case where the leading edge passes through the first nip portion, and so as to move the leading edge in a direction apart from the image forming portion in a case where the leading edge passes through the second nip portion, wherein the drive roller, the first rotation member, and the second rotation member are configured to convey the sheet in a state where the sheet is present at the first nip portion and the second nip portion at a same time, and the first nip portion and the second nip portion are disposed so that the sheet is conveyed to the first nip portion from the second nip portion, and wherein the first nip portion is disposed in a sheet conveyance path through which the sheet passes before an image is formed on one side of the sheet, and the second nip portion is disposed in a sheet conveyance path for conveying the sheet with an image formed on the one side thereof to the image forming portion again.

2. The image forming apparatus according to claim 1, wherein the drive roller is rotated only in one direction by a driving force from the drive source.

3. The image forming apparatus according to claim 1, further comprising a guide member provided between the first nip portion and the second nip portion and configured to guide the sheet so as to change a moving direction of the leading edge of the sheet from the direction apart from the image forming portion to the direction approaching the image forming portion.

4. The image forming apparatus according to claim 1, further comprising:

a sheet storage unit configured to stack and store the sheet;

a pick roller configured to feed the sheet stacked and stored in the sheet storage unit; and a regulation member disposed on a downstream side of the pick roller and an upstream side of the image forming portion in a conveyance direction of the sheet, and configured to regulate the leading edge of the sheet to correct a skew of the sheet.

5. The image forming apparatus according to claim 4, wherein the regulation member includes a surface configured to contact the sheet, the surface being located on an upstream side of the first nip portion in the conveyance direction.

6. The image forming apparatus according to claim 1, wherein the first rotation member is larger in diameter than the second rotation member.

7. The image forming apparatus according to claim 1, further comprising:

a main body frame configured to accommodate the image forming portion; and a door configured to be openable and closable with respect to the main body frame, wherein, in a case where the door is in a closed state, a driving force is transmitted from the drive source to the drive roller, and wherein, in a case where the door is in an open state, the driving force is not transmitted from the drive source to the drive roller.

8. The image forming apparatus according to claim 7, wherein, in the case where the door is in the open state, the second rotation member and the drive roller form the second nip portion.

9. The image forming apparatus according to claim 7, further comprising a drive unit configured to receive the driving force from the drive source, wherein the drive roller is rotated together with a drive shaft, wherein the drive unit includes a drive transmission member configured to transmit the driving force received from the drive source to the drive shaft, and wherein the drive shaft includes a driven transmission member configured to receive the driving force from the drive transmission member.

10. The image forming apparatus according to claim 9, wherein movement of the drive unit toward the drive roller in a rotation axis direction of the drive shaft causes engagement of the drive transmission member and the driven transmission member.

11. The image forming apparatus according to claim 10, further comprising a drive release member configured to release the engagement of the drive transmission member and the driven transmission member, wherein, in a case where the door becomes the open state, the drive release member urges the drive unit in a direction apart from the drive roller with respect to the rotation axis direction.

12. The image forming apparatus according to claim 11, wherein the drive release member is urged with a first urging force in the direction apart from the drive roller with respect to the rotation axis direction, wherein the drive unit is urged with a second urging force smaller than the first urging force in a direction approaching the drive roller with respect to the rotation axis direction, wherein the door includes a pressure receiving portion, wherein the drive release member has an opening, and wherein, in the case where the door is in the closed state, the pressure receiving portion is brought into contact with the drive release member and receives the first urging force to enable the drive unit to move toward the drive roller in the rotation axis direction.

13. The image forming apparatus according to claim 12, wherein the pressure receiving portion includes a slope portion sloped toward a direction urged by the first urging force, and wherein, in a case where the door is in a state between the open state and the closed state, the slope portion receives the first urging force to cause the door to open.

14. The image forming apparatus according to claim 1, wherein a length of a sheet conveyance path from the second nip portion to the first nip portion is shorter than a length of a sheet supported in duplex printing by the image forming apparatus.

* * * * *